UNITED STATES PATENT OFFICE.

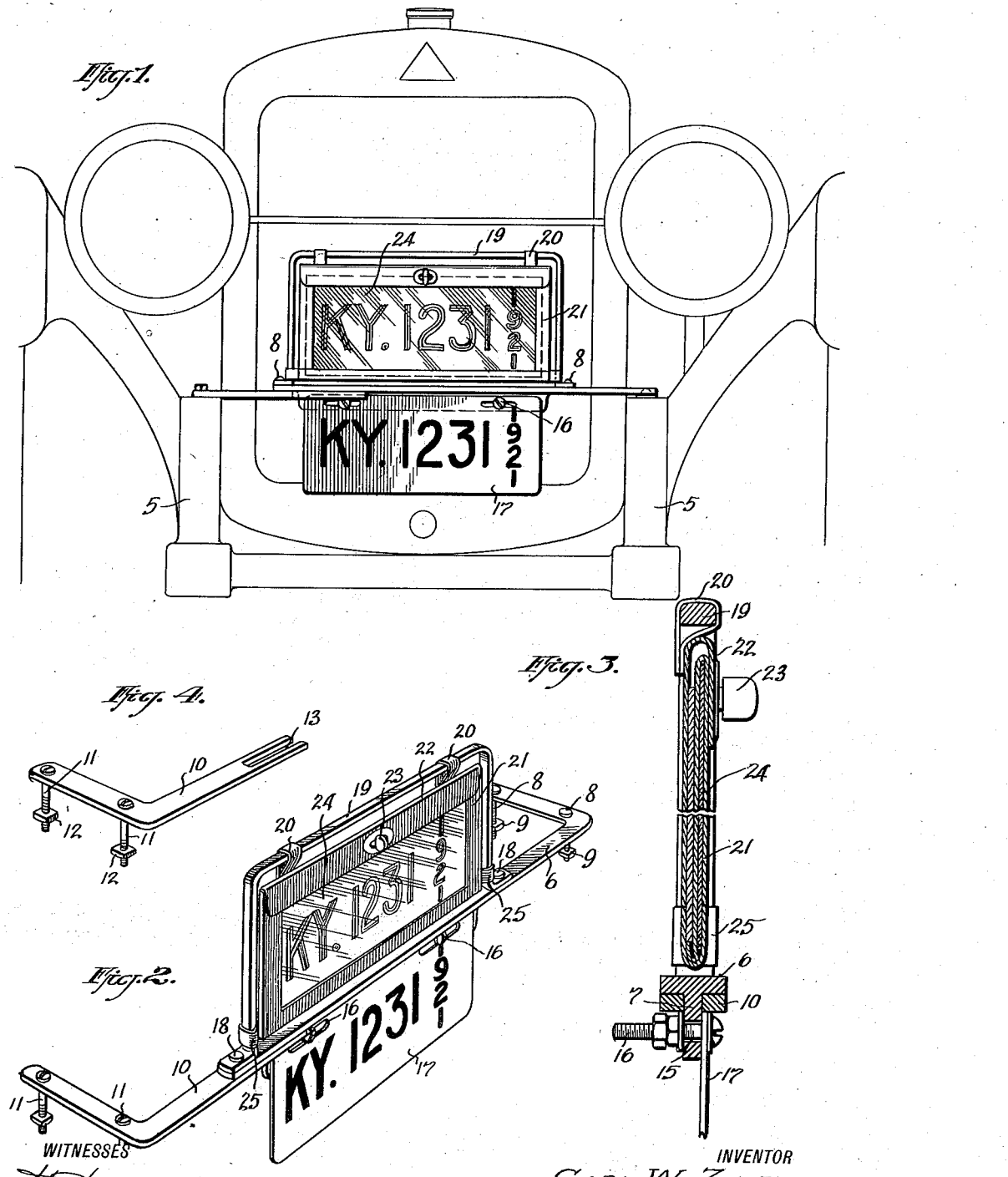

CARL W. ZINT, OF FORT THOMAS, KENTUCKY.

AUTOMOBILE-IDENTIFYING DEVICE.

1,402,702. Specification of Letters Patent. Patented Jan. 3, 1922.

Application filed July 23, 1921. Serial No. 486,988.

*To all whom it may concern:*

Be it known that I, CARL WILLIAM ZINT, a citizen of the United States, and a resident of Fort Thomas, in the county of Campbell and State of Kentucky, have invented a new and Improved Automobile-Identifying Device, of which the following is a full, clear, and exact description.

The present invention relates to new and useful improvements in automobile license plates, and it pertains more particularly to a new and improved supporting means therefor.

It is one of the primary objects of the invention to provide means by which the automobile may be properly identified in order to prevent surreptitious use thereof.

It is a further object of the invention to provide the automobile with two license plates at the front thereof, which license plates contain corresponding data in order that it may be ascertained by the use of the two plates whether or not the automobile is being operated by the owner or person authorized to operate the same.

With the above and other objects in view, reference is had to the accompanying drawings, in which—

Figure 1 is a detail view in elevation of the forward portion of a motor vehicle showing the position and attachment of the license-plate holder;

Fig. 2 is a detail perspective view of the license-plate holder;

Fig. 3 is a vertical sectional view thereof;

Fig. 4 is a detail perspective view of one portion of the supporting bracket which carries the license-plate holder.

Referring more particularly to the drawings, the reference character 5 designates the side frames of a motor vehicle chassis. The reference character 6 designates a substantially L-shaped bracket member, and said bracket member is provided upon its under face with an integral depending flange 7. This bracket is secured to one of the side frames by means of bolts or the like 8, upon which are threaded nuts 9, it being understood that said bolts 8 pass through suitable openings in the side frames 5 of the chassis.

The reference character 10 designates a similar L-shaped bracket member, the same, however, being of smaller dimensions than the bracket 6. The member 10 is secured to the other side frame by means of bolts 11, upon which are threaded nuts 12. The free end of this bracket member 11 is bifurcated as at 13, in order that it may receive the flange 7 of the member 6, as more clearly shown in Fig. 3. The depending flange 7 of the member 6 is provided with a plurality of perforations 15, and mounted in said perforations 15 are bolts 16, which bolts serve to secure in position a license plate 17, which license plate 17 is that plate permanently carried by the vehicle.

Secured to the bracket member 1 by means of suitable fastenings 18, is an inverted U-shaped member 19, and suspended from the U-shaped member 19 as by straps 20 or the like, is a frame member 21. This frame member 21 is provided on its upper edge with a closing plate 22 retained in closed position by means of a rotary button or similar fastening 23. This frame member 21 is adapted to carry a license plate 24 corresponding with the license plate 17 heretofore mentioned. In order to prevent swaying of the frame 21, straps or similar means 25 carried by the frame engage the leg members of the inverted U-shaped member 19.

The device operates in the following manner:

The owner or authorized driver of the vehicle operating the same, places the license plate 24 within the frame member 21, as shown in Figs. 1 and 2 of the drawings. During such times as the motor vehicle is standing or not being operated, the license plate 24 is removed from the frame member 21 by the owner or authorized operator, and is carried with him on all occasions when he leaves the car.

From the foregoing it is apparent that with the above identification means in use, the absence of the number license plate 24 would indicate that an unauthorized person was operating the vehicle, since with an authorized person operating the same, the license plate 24 would be within the frame member 21 and would be visible from the front of the vehicle.

While in the present instance the frame member 21 is described as being formed of leather, it is obvious that the material from which the frame member is constructed and the manner in which it is suspended and retained in the inverted U-shaped member 19, are really immaterial since the material and manner of attachment may be varied without departing from the spirit and scope of the invention.

I claim:

1. A device of the character described comprising a bracket consisting of two members, a depending flange portion formed on one of said members, said depending flange portion being adapted to be received by the other of said members to prevent relative movement of the members in one direction, means for securing an identification plate to said depending flange, a U-shaped bracket secured to the first-mentioned bracket and arranged at right angles thereto, and means for displaying a second identification plate, said identification-plate-displaying means being suspended within the second-mentioned bracket, substantially as described.

2. A device of the character described comprising a two-part bracket, the members of said bracket having interengagement one with the other, a depending flange formed on one of said members and adapted for engagement with a slot formed in the other of said members, means for supporting an identification plate from said flange, and a second bracket right-angularly disposed with respect to the first-mentioned bracket, said second-mentioned bracket being formed of a single piece of material.

CARL W. ZINT.